United States Patent
Park et al.

(10) Patent No.: US 9,469,302 B2
(45) Date of Patent: Oct. 18, 2016

(54) TORQUE CONTROL APPARATUS AND METHOD AND MOTOR CONTROLLER

(71) Applicant: Hyundai Motor Company, Seoul (KR)

(72) Inventors: Han Hee Park, Gyeonggi-do (KR); Gu Bae Kang, Gyeonggi-do (KR); Tae Il Yoo, Geyonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/870,315

(22) Filed: Sep. 30, 2015

(65) Prior Publication Data

US 2016/0114801 A1    Apr. 28, 2016

(30) Foreign Application Priority Data

Oct. 28, 2014  (KR) .......................... 10-2014-0147688

(51) Int. Cl.
*B60W 30/18*       (2012.01)

(52) U.S. Cl.
CPC ................................... *B60W 30/18* (2013.01)

(58) Field of Classification Search
CPC ....... B60W 30/18; H02P 6/165; H02P 7/285; H02K 37/14; C01B 3/384
USPC .......... 701/22; 318/432, 400.32; 310/156.08; 429/412
See application file for complete search history.

(56) References Cited

U.S. PATENT DOCUMENTS

| 4,401,906 A * | 8/1983 | Isobe | H02K 37/14 310/156.08 |
|---|---|---|---|
| 2004/0007997 A1 | 1/2004 | Fu | |
| 2006/0159970 A1* | 7/2006 | Kato | C01B 3/384 429/412 |
| 2009/0153087 A1 | 6/2009 | Lim et al. | |
| 2010/0109586 A1 | 5/2010 | Matsui et al. | |
| 2012/0212169 A1* | 8/2012 | Wu | H02P 7/285 318/432 |
| 2013/0193886 A1* | 8/2013 | Yoon | H02P 6/165 318/400.32 |

FOREIGN PATENT DOCUMENTS

| JP | 2002-078390 A | 3/2002 |
|---|---|---|
| JP | 2010-110141 A | 5/2010 |
| JP | 2011-143850 A | 7/2011 |
| JP | 2014-515244 A | 6/2014 |
| KR | 2009-0062663 A | 6/2009 |

* cited by examiner

*Primary Examiner* — Yuri Kan
(74) *Attorney, Agent, or Firm* — Mintz Levin Cohn Ferris Glovsky and Popeo, P.C.; Peter F. Corless

(57) ABSTRACT

A torque control apparatus includes: a flux linkage estimator estimating a variation of flux linkage based on a difference between a current temperature of a motor measured by a temperature sensor and a predefined reference temperature; a torque compensation value calculator calculating a torque compensation value corresponding to the current temperature of the motor based on the estimated variation of flux linkage; and a torque compensator compensating for an error of required torque of a torque command by applying the calculated torque compensation value in response to a change in temperature of the motor and outputting a final torque command including the error-compensated required torque to a current map of a motor controller.

9 Claims, 8 Drawing Sheets

TORQUE CONTROL APPARATUS AND METHOD AND MOTOR CONTROLLER

CROSS-REFERENCE TO RELATED APPLICATION

This application claims the benefit of and priority to Korean Patent Application No. 10-2014-0147688, fried on Oct. 28, 2014 in the Korean Intellectual Property Office, the disclosure of which is incorporated herein in its entirety by reference.

TECHNICAL FIELD

The present disclosure relates generally to a torque control apparatus and method and a motor controller, and more particularly, to a technology of compensating for an error of required torque in response to a change of temperature of a motor.

BACKGROUND

Eco-friendly vehicles such as hybrid vehicles and electric vehicles use a motor system configured of a motor and an inverter as their main power source. Therefore, torque and output performance of a driving motor considerably affect performance of such vehicles, and improvement and/or reduction in the output performance of the driving motor may affect overall performance of the vehicle.

To maintain stable driving performance of one such vehicle, it is important for the driving motor to constantly output a torque matching a required torque. Output performance of a permanent magnet synchronous motor is affected by operation conditions such as speed, voltage, and temperature. However, there is a need to consider the operation conditions, such as speed, voltage, and torque command, at the time of selecting a current command corresponding to the required torque in a current map. As such, when the temperature of the motor is not considered, a motor controller can select a current command for a reference temperature, and a torque error occurs due to a difference between the reference temperature and an actual temperature. Therefore, the driving motor may not constantly output a torque matching the required torque.

SUMMARY

The present disclosure has been made to solve the above-mentioned problems occurring in the prior art, while advantages achieved by the related art are maintained intact.

An aspect of the present disclosure provides a torque control apparatus and method and a motor controller capable of estimating a torque error depending on a temperature of a motor and compensating for the torque error to enable a driving motor for an eco-friendly vehicle to obtain a constant output independent of a temperature condition.

According to embodiments of the present disclosure, a torque control apparatus includes: a flux linkage estimator estimating a variation of flux linkage based on a difference between a current temperature of a motor measured by a temperature sensor and a predefined reference temperature; a torque compensation value calculator calculating a torque compensation value corresponding to the current temperature of the motor based on the estimated variation of flux linkage; and a torque compensator compensating for an error of required torque of a torque command by applying the calculated torque compensation value in response to a change in temperature of the motor and outputting a final torque command including the error-compensated required torque to a current map of a motor controller.

The flux linkage estimator may estimate the variation of flux linkage according to a value which is obtained by multiplying a value obtained by subtracting the current temperature of the motor from the reference temperature by a predefined flux linkage reference value.

The torque compensation value calculator may calculate the torque compensation value according to a value which is obtained by multiplying the variation of flux linkage by the number of poles of the motor by a torque-shaft current value.

The torque compensator may output the final torque command according to a value obtained by adding the required torque to the torque compensation value.

Furthermore, according to embodiments of the present disclosure, a torque control method includes: estimating a variation of flux linkage based on a difference between a current temperature of a motor measured by a temperature sensor and a predefined reference temperature; calculating a torque compensation value corresponding to the current temperature of the motor based on the estimated variation of flux linkage; compensating for an error of required torque of a torque command by applying the calculated torque compensation value in response to a change in temperature of the motor; and outputting a final torque command including the error-compensated required torque to a current map of a motor controller.

The estimating of the variation of flux linkage may include: estimating the variation of flux linkage according to a value which is obtained by multiplying a value obtained by subtracting the current temperature of the motor from the reference temperature by a predefined flux linkage reference value.

The calculating of the torque compensation value may include: calculating the torque compensation value according to a value which is obtained by multiplying the variation of flux linkage by the number of poles of the motor by a torque-shaft current value.

The compensating for the error of required torque may include: compensating for the error of required torque based on the change in temperature of the motor by adding the torque compensation value to the required torque.

Furthermore, according to embodiments of the present disclosure, a motor controller includes: a torque control apparatus estimating a variation of flux linkage based on a change in temperature of a motor measured by a temperature sensor and compensating for an error of required torque of a torque command based on a torque compensation value corresponding to a current temperature of the motor calculated based on the estimated variation of flux linkage; a current map selecting and outputting a current command matching the torque command based on the required torque error-compensated by the torque control apparatus, a rotating speed of the motor, and a voltage; a current regulator selecting and outputting a voltage command corresponding to the current command selected by the current map; and an electric power module converting a required voltage of the voltage command into a 3-phase voltage of a pulse width modulation (PWM) form and outputting the 3-phase voltage to the motor.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION OF THE EMBODIMENTS

Figure 1:
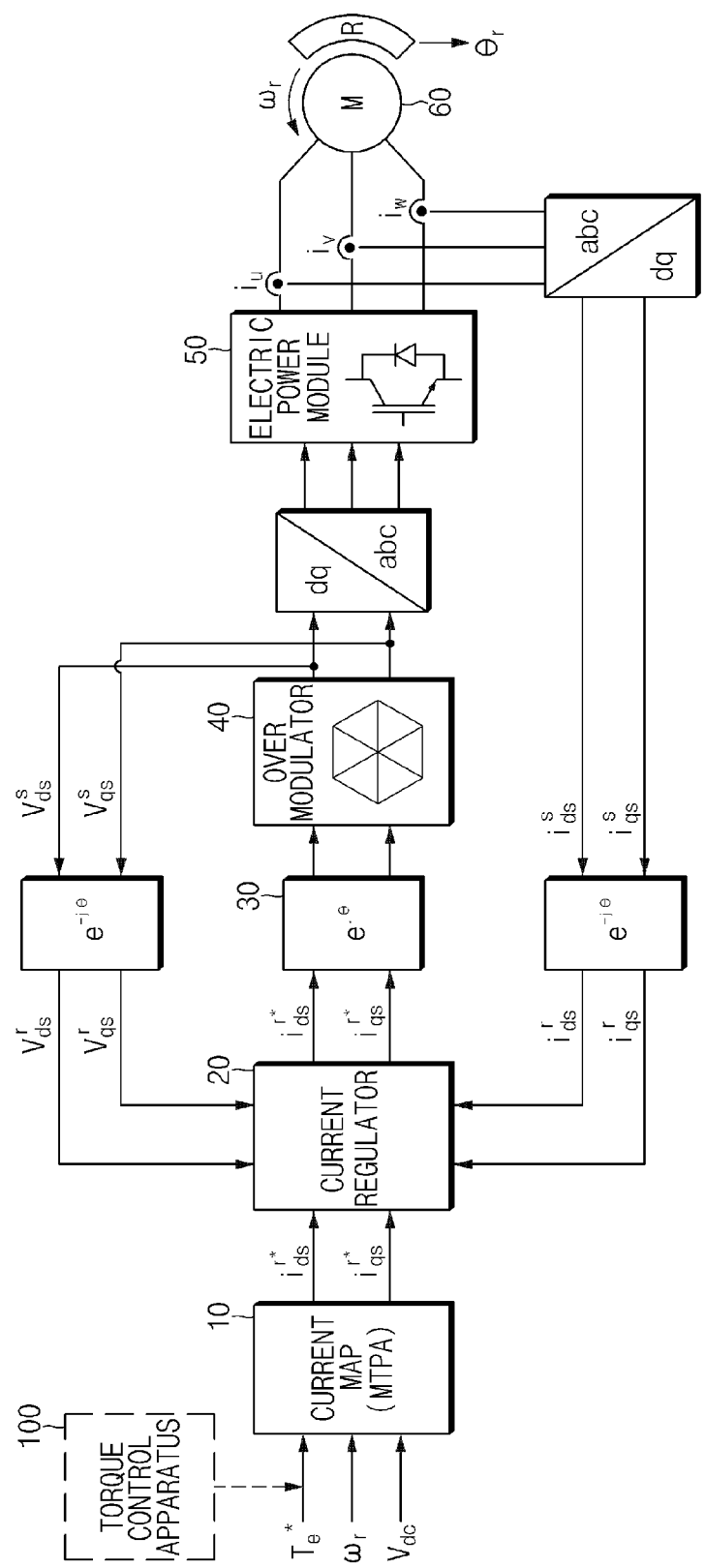
FIG. 1 is a diagram illustrating a motor controller according to embodiments of the present disclosure.

It is to be noted that technical terms used in the specification are used for describing specific embodiments and do not limit the present disclosure. In addition, unless indicated otherwise in the specification, it is to be understood that all the technical terms used in the specification are construed as meaning as those that are generally understood by those skilled in the art and not as excessively comprehensive meanings and excessively reduced meanings. In addition, when the technical terms used in the specification are wrongly technical terms that do not accurately indicate the technical spirit of the present disclosure, it is to be understood that the terms are replaced with the technical terms comedy understood by those skilled in the art. Further, the general terms used in the present disclosure must be understood according to the terms defined by the dictionary or the context and should not be excessively reduced meanings.

In addition, singular forms used in the specification are intended to include plural forms unless the context clearly indicates otherwise. In the specification, it is to be noted that the terms "comprising" or "including', and the like, are not be construed as necessarily including several components or several steps described in the specification and some of the above components or steps may not be included or additional components or steps are construed as being further included.

Terms including an ordinal number such as first, second, or the like, used in the present specification may be used to describe various components. However, these components are not limited to these terms. The terms are used to differentiate one component from other components. For example, the 'first' component may be named the 'second' component, and vice versa, without departing from the scope of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Hereinafter, embodiments of the present disclosure will be described in more detail with reference to the accompanying drawings. The same reference numerals will be used to describe the same or like components, independent of the reference numerals and an overlapped description of the same components will be omitted. Further, when it is determined that the detailed description of the known art related to the present disclosure may obscure the gist of the present disclosure, the detailed description thereof will be omitted. In addition, it is to be noted that the accompanying drawings are provided only in order to allow the spirit of the present disclosure to be easily understood and is not to be interpreted as limiting the spirit of the present disclosure by the accompanying drawings.

FIG. 1 is a diagram illustrating a motor controller according to embodiments of the present disclosure.

A motor controller according to the present disclosure uses a synchronous reference frame current regulator. As shown in FIG. 1, the motor controller may include a current map (maximum torque per ampere (MTPA)) 10, a current regulator 20, a coordinate converter 30, an over modulator 40, and an electric power module 50. In this case, when a motor 60 which rotates at an electric angular velocity $\omega_r$ is given a required torque $T_e^*$, the current map 10 receives the required torque $T_e^*$, the electric angular velocity $\omega_r$ and a speed $V_{dc}$ to select current commands Idsr* and Iqsr* matching the required torque and output the selected current commands to the current regulator 20.

In the motor controller according to the present disclosure, a torque control apparatus 100 for compensating for a torque error depending on a temperature of the motor 60 may be disposed at a required torque input terminal of the current map 10. Further, the motor controller may further include a temperature sensor (not illustrated) which provides a temperature of the motor 60 to the torque control apparatus 100. The motor control apparatus 100 estimates the torque error depending on the temperature of the motor 60 and calculates a torque compensation value depending on the estimated torque error and reflects the calculated torque compensation value to the required torque $T_e^*$ depending on a torque command to apply a final torque command of which the torque error is compensated to the current map 10. Therefore, the current map 10 selects current commands Idsr* and Iqsr* matching the final torque command of which the torque error depending on the temperature of the motor 60 is compensated and outputs the selected current commands Idsr* and Iqsr* to the current regulator 20.

The current regulator 20 selects and outputs voltage commands Vdsr* and Vqsr* to enable the current commands Idsr* and Iqsr* received from the current map 10 to flow in the motor 60. In this case, the voltage commands Vdsr* and Vqsr* which are output from the current regulator 20 are input to the electric power module 50 through the coordinate converter 30 and the over modulator 40.

The electric power module 50 converts the voltage commands Vdsr* and Vqsr* into a 3-phase voltage of a pulse width modulation (PWM) form and applies the 3-phase voltage to the motor 60. In this case, the voltage command applied to the motor 60 is selected in a state in which the torque error depending on the temperature of the motor 60 is compensated and therefore the motor 60 constantly outputs a torque matching the required torque of the torque command.

Therefore, a detailed description of the torque control apparatus 100 which compensates for the torque error of the motor controller will be described with reference to embodiments of FIG. 2.

Figure 2:
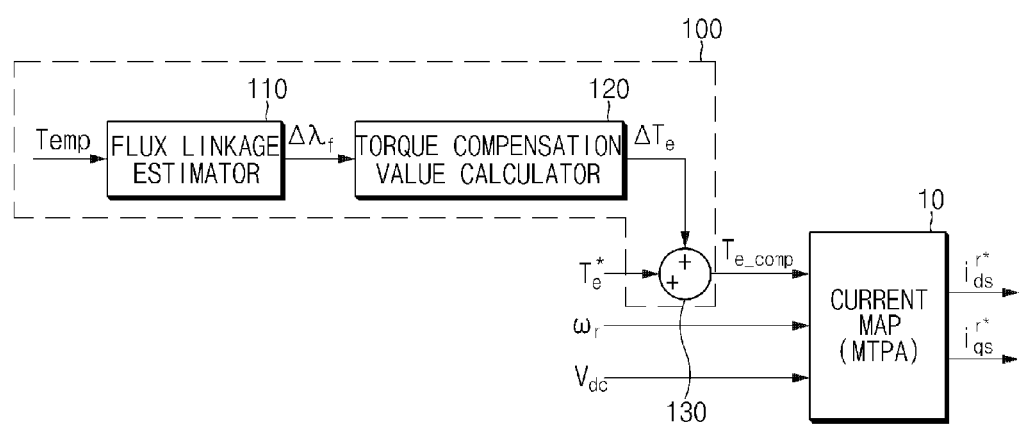
FIG. 2 is a diagram illustrating a torque control apparatus according to embodiments of the present disclosure.

FIG. 2 is a diagram illustrating a torque control apparatus according to embodiments of the present disclosure.

As illustrated in FIG. 2, the torque control apparatus 100 is disposed at the required torque input terminal of the current map 10. Therefore, the torque control apparatus 100 may include a flux linkage estimator 110, a torque compensation value calculator 120, and a torque compensator 130.

First, when the current temperature of the motor is input from the temperature sensor measuring the temperature of the motor, the flux linkage estimator 110 estimates the variation of flux linkage depending on the input temperature of the motor and outputs the estimated variation to the torque compensation value calculator 120. Here, detailed components of the flux linkage estimator 110 may be illustrated as in FIG. 3.

Figure 3:
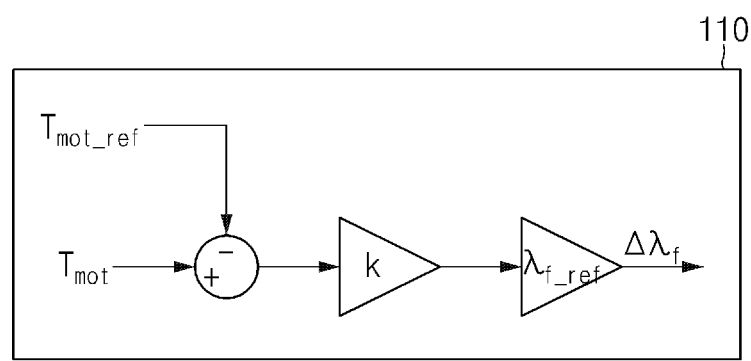
FIG. 3 is a diagram referenced to describe a configuration of a flux linkage estimator of FIG. 2.

As illustrated in FIG. 3, when a current temperature $T_{mot}$ of the motor is input from the temperature sensor, the flux linkage estimator 110 calculates a difference between a predefined reference temperature $T_{mot\_ref}$ and the current temperature $T_{mot}$ of the motor to estimate the variation of flux linkage. The variation of flux linkage may be calculated based on the following [Equation 1] and [Equation 2].

$$\lambda_f = \lambda_{f\_ref} \times \{1 + (Temp_{ref} - Temp) \times k\} \quad \text{[Equation 1]}$$

$$\Delta\lambda_f = \lambda_{f\_ref} \times \{(Temp_{ref} - Temp) \times k\} \quad \text{[Equation 2]}$$

In the above Equations, $\lambda_f$ represents the flux linkage, $\Delta\lambda_f$ represents the variation of flux linkage $\lambda_{f\_ref}$ represents reference flux linkage, $Temp_{ref}$ represents a reference temperature, Temp represents the current temperature of the motor, and k represents a temperature coefficient [%/° C.] of the flux linkage.

As such, the variation of flux linkage may be calculated by multiplying a value obtained by subtracting the current temperature of the motor from the reference temperature by the temperature coefficient of the flux linkage, and the reference flux linkage together. The flux linkage estimator 110 outputs the calculated variation of flux linkage to the torque compensation value calculator 120.

The torque compensation value calculator 120 uses the variation of flux linkage input from the flux linkage estimator 110 to calculate the torque compensation value for compensating for the torque error depending on the current temperature of the motor. Detailed components of the torque compensation value calculator 120 may be illustrated as in FIG. 4.

Figure 4:
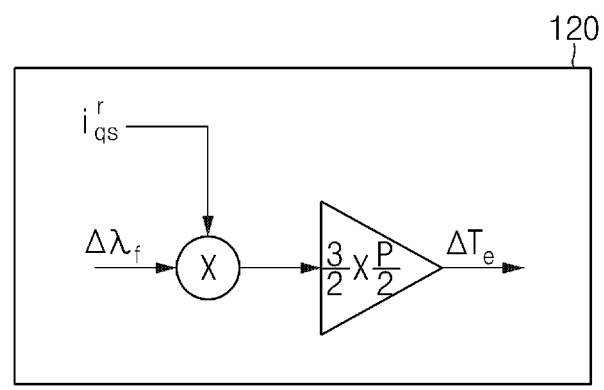
FIG. 4 is a diagram referenced to describe a configuration of a torque compensation value calculator of FIG. 3.

As illustrated in FIG. 4, when the variation $\Delta\lambda_f$ of flux linkage is input from the flux linkage estimator 110, the torque compensation value calculator 120 calculates the torque compensation value using the variation $\Delta\lambda_f$ of flux linkage, a torque-shaft current value iqsr of the motor, and the number P of poles of the motor to calculate the torque compensation value. The torque compensation value may be calculated based on the following [Equation 3].

$$\Delta T_e = \frac{3}{2} \times \frac{P}{2} \times \Delta\lambda_f \times i_{qs}^r \quad \text{[Equation 3]}$$

In the above Equation 3, $\Delta T_e$ represents the torque compensation value, P represents the number of poles of the motor, $\Delta\lambda_f$ represents the variation of flux linkage, and iqsr represents the torque-shaft (i.e., q-shaft) current value.

As such, the torque compensation value may be calculated by multiplying the variation $\Delta\lambda_f$ of flux linkage by the torque-shaft current value iqsr of the motor, and $$\frac{3}{2} \times \frac{P}{2}$$

together. The torque compensation value calculator 120 outputs the calculated torque compensation value to the torque compensator 130.

The torque compensator 130 applies the calculated torque compensation value in response to the current temperature of the motor to compensate for the error of the required torque of the torque command. When the required torque $T_e^*$ of the torque command is input, the torque compensator 130 applies the torque compensation value $\Delta T_e$ input from the torque compensation value calculator 120 to the required torque $T_e^*$ to compensate for the torque error depending on the current temperature of the motor.

The required torque of the torque command may be represented by the following [Equation 4].

$$T_e^* = \frac{3}{2} \times \frac{P}{2} \times [(L_d - L_q) \times i_{ds}^r \times i_{qs}^r + \lambda_f \times i_{qs}^r] \quad \text{[Equation 4]}$$

In the above Equation 4, $T_e^*$ represents the required torque, P represents the number of poles of the motor, $L_d$ represents flux-shaft (d-shaft) inductance, $L_q$ represents torque-shaft (q-shaft) inductance, idsr represents the flux-shaft (d-shaft) current value, iqsr represents the torque shaft (q-shaft) current value, and $\lambda_f$ represents the flux linkage.

Therefore, the torque compensator 130 outputs the final torque command including the error-compensated required torque $T_{e\_comp}$ to the current map 10 of the motor controller. The error-compensated required torque may be calculated based on the following [Equation 5].

$$T_{e\_comp} = T_e^* + \Delta T_e \quad \text{[Equation 5]}$$
$$= \frac{3}{2} \times \frac{P}{2} \times [(L_d - L_q) \times i_{ds}^r \times i_{qs}^r + (\lambda_f + \Delta\lambda_f) \times i_{qs}^r]$$

In the above Equation 5, $T_{e\_comp}$ represents the error-compensated required torque, $T_e^*$ represents the required torque, and $\Delta T_e$ represents the torque compensation value. Therefore, the error-compensated required torque may be calculated by adding the required torque $T_e^*$ to the torque compensation value Te.

As such, the torque control apparatus 100 compensates for the torque error of the required torque of the torque command depending on the current temperature of the motor to output the final torque command to the current map 10, thereby enabling the motor to output the constant torque matching the required torque.

An operation flow of the torque control apparatus according to embodiments of the present disclosure configured as described above will be described below in more detail.

Figure 5:
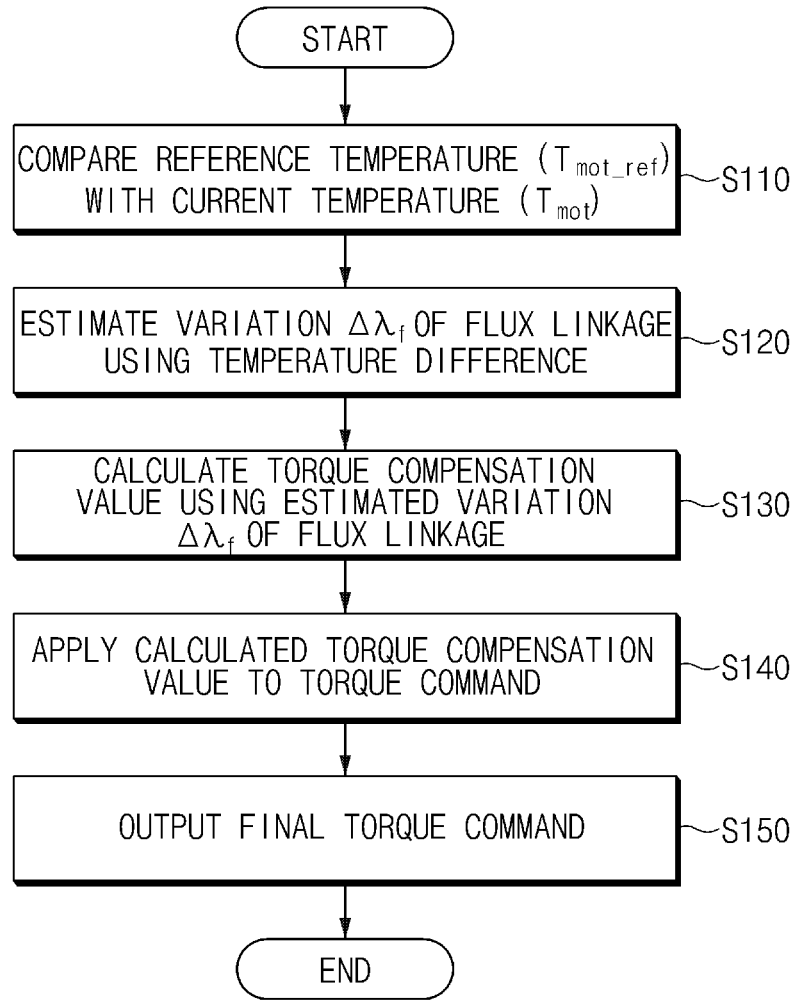
FIG. 5 is a flowchart illustrating an operation flow of a torque control method according to embodiments of the present disclosure.

FIG. 5 is a flowchart illustrating an operation flow of a torque control method according to embodiments of the present disclosure. As illustrated in FIG. 5, when the current temperature $T_{mot}$ of the motor is input from the temperature sensor, the torque control apparatus compares the input current temperature $T_{mot}$ of the motor with the predefined reference temperature $T_{mot\_ref}$ (S110).

As the comparison result of the process 'S110', the variation $\Delta\lambda_f$ of flux linkage is estimated by calculating the difference between the predefined reference temperature $T_{mot\_ref}$ and the current temperature $T_{mot}$ of the motor (S120). Here, the above [Equation 2] will be referenced as the Equation for calculating the variation of flux linkage.

Further, the torque control apparatus uses the variation $\Delta\lambda_f$ of flux linkage estimated in the process 'S120' to calculate the torque compensation value for compensating for the torque error depending on the current temperature of the motor (S130). Here, the above [Equation 3] will be referenced as the Equation for calculating the torque compensation value.

In this case, the torque control apparatus applies the torque compensation value calculated in the process 'S130' to the required torque of the torque command to compensate for the torque error depending on the current temperature of the motor (S140). Here, the above [Equation 4] will be referenced as the Equation for calculating the error-compensated required torque.

Next, the torque control apparatus outputs the final torque command including the required torque error-compensated in the process 'S140' to the current map of the motor controller (S150).

Figure 6:
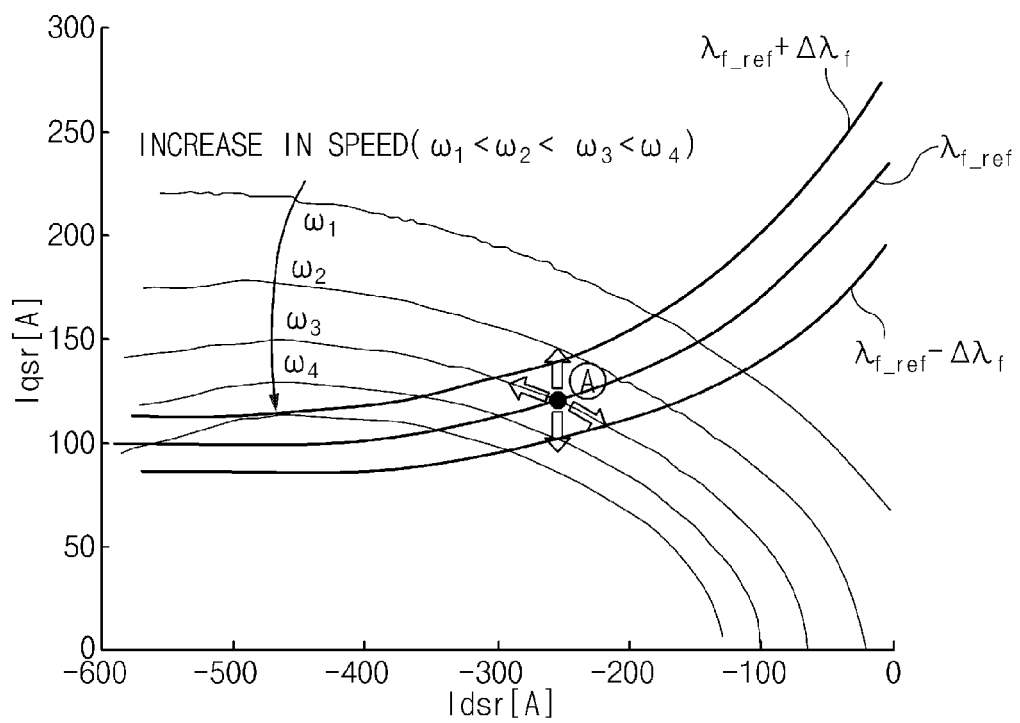
FIG. 6 is an exemplified diagram referenced to describe a current command selection operation of a motor controller according to embodiments of the present disclosure.

FIG. 6 is an exemplified diagram referenced to describe a current command selection operation of a motor controller according to embodiments of the present disclosure. In particular, FIG. 6 illustrates a portion of an equi-torque curve and a voltage limit ellipse of a permanent magnet synchronous motor.

As shown in FIG. 6, based on the equi-torque curve for a flux linkage value at a reference temperature, that is, a reference flux linkage $\lambda_{f\_ref}$ when the temperature of the motor is lower than the reference temperature, the flux linkage value has a value $\lambda_{f\_ref}+\Delta\lambda_f$ larger than the reference flux linkage. On the other hand, when the temperature of the motor is higher than the reference temperature, the flux linkage value has a value $\lambda_{f\_ref}-\Delta\lambda_f$ lower than the reference flux linkage.

Meanwhile, the voltage limit ellipse represents a range of the controllable command currents idsr* and iqsr*, which is determined by an input voltage $V_{dc}$ and a rotating speed of the motor. As illustrated in FIG. 6, when the input voltage is reduced or the rotating speed of the motor is increased, the voltage limit ellipse is reduced.

In the reference flux linkage, if a current command under a specific operation condition (e.g., voltage, speed, or torque command) is ⓐ, a position of ⓐ varies in response to a change in temperature. Here, the d-shaft current command is not affected by temperature and therefore is constant and only the q-shaft current command is vertically changed in response to the temperature.

In this case, when the current command deviates from the voltage limit ellipse, a current may not be controlled. According to the exemplary embodiment of the present disclosure, the torque error of the torque command depending on the temperature is compensated and therefore the current command is determined as a value within the voltage limit ellipse.

Figure 7:
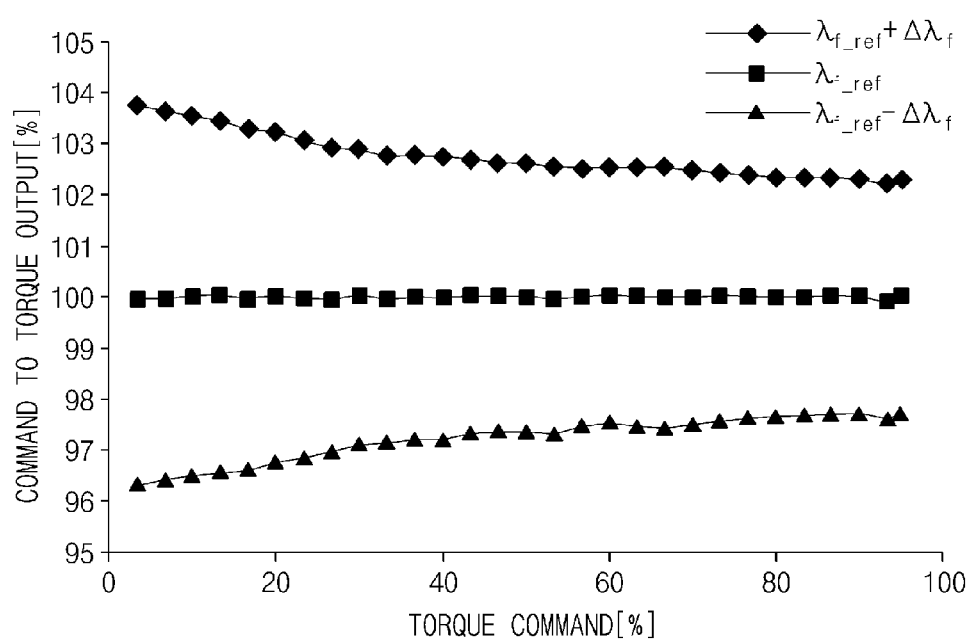
FIGS. 7 and 8 are exemplified diagrams referenced to describe a change in a torque output of the motor controller according to embodiments of the present disclosure.
Figure 8:
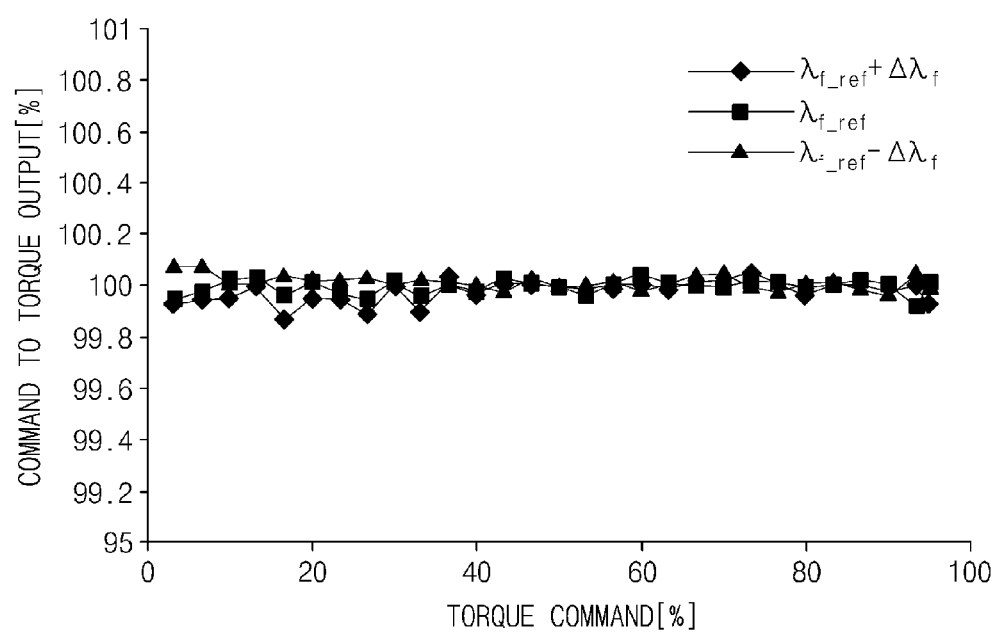

FIGS. 7 and 8 are exemplified diagrams referenced to describe a change in a torque output of the motor controller according to embodiments of the present disclosure. Each point of FIGS. 7 and 8 represents a real output torque for the required torque $T_e^*$ of the torque command.

First, FIG. 7 is a graph illustrating the output torque when the torque error of the required torque depending on the temperature of the motor is not compensated, in which it may be confirmed that the torque matching the torque command at the reference temperature is output, but when the flux linkage is increased or reduced in response to the change in temperature, the torque error of about 2 to 4% occurs.

Meanwhile, FIG. 8 is a graph illustrating the output torque when the torque error of the required torque depending on the temperature of the motor is compensated, in which it may be confirmed that since the torque compensation value is calculated using the difference in flux linkage in response to the temperature difference and then the calculated torque compensation value is applied to the required torque, the torque approximating the required torque of the desired torque command is output regardless of the temperature of the motor.

According to the embodiments of the present disclosure disclosed herein, the error of the required torque of the torque command occurring due to the temperature difference is compensated for by estimating the variation of flux linkage based on the change in temperature of the motor, in order to enable the motor to constantly output the torque matching the required torque, thereby keeping the driving performance of the vehicle stable.

The processes may be directly implemented by a hardware module and a software module which are executed by a processor or a combination thereof. The software module may reside in a storage medium such as an RAM memory, a flash memory, an ROM memory, an EPROM memory, an EEPROM memory, a register, a hard disk, a detachable disk, and a CD-ROM, that is, a memory and/or a storage. The exemplified storage medium is coupled with the processor which may read information from the storage media and write the information in the storage medium. As another method, the storage medium may be integrated with the processor. The processor and the storage medium may reside in an application specific integrated circuit (ASIC). The ASIC may reside in a user terminal. As another method, the processor and the storage medium may reside in the user terminal as an individual component.

Hereinabove, although the present disclosure has been described by specific matters such as detailed components, and the like, embodiments, and the accompanying drawings, they have been provided only for assisting in the entire understanding of the present disclosure. Therefore, the present disclosure is not limited to the above-mentioned exemplary embodiments, but may be variously modified and altered by those skilled in the art to which the present disclosure pertains without departing from the spirit and scope of the present disclosure. Therefore, the present disclosure is not to be limited to the above-mentioned embodiments. That is, the following claims as well as all contents modified equally or equivalently to the claims are to fall within the scopes and spirits of the present disclosure.

What is claimed is:

1. A torque control apparatus, comprising:

a flux linkage estimator estimating a variation of flux linkage based on a difference between a current temperature of a motor measured by a temperature sensor and a predefined reference temperature;

a torque compensation value calculator calculating a torque compensation value corresponding to the current temperature of the motor based on an estimated variation of flux linkage; and a torque compensator compensating for an error of required torque of a torque command to by applying the calculated torque compensation value in response to a change in temperature of the motor and outputting a final torque command including an error-compensated required torque to a current map of a motor controller.

2. The torque control apparatus according to claim 1, wherein the flux linkage estimator estimates the variation of flux linkage according to a value which is obtained by multiplying a value obtained by subtracting the current temperature of the motor from a reference temperature by a predefined flux linkage reference value.

3. The torque control apparatus according to claim 1, wherein the torque compensation value calculator calculates the torque compensation value according to a value which is obtained by multiplying the variation of flux linkage by a number of poles of the motor by a torque-shaft current value.

4. The torque control apparatus according to claim 1, wherein the torque compensator outputs the final torque command according to a value obtained by adding a required torque to the torque compensation value.

5. A torque control method, comprising:
estimating a variation of flux linkage based on a difference between a current temperature of a motor measured by a temperature sensor and a predefined reference temperature;
calculating a torque compensation value corresponding to the current temperature of the motor based on an estimated variation of flux linkage;
compensating for an error of required torque of a torque command by applying the calculated torque compensation value in response to a change in temperature of the motor; and
outputting a final torque command including an error-compensated required torque to a current map of a motor controller.

6. The torque control method according to claim 5, wherein the estimating of the variation of flux linkage comprises:
estimating the variation of flux linkage according to a value which is obtained by multiplying a value obtained by subtracting the current temperature of the motor from a reference temperature by a predefined flux linkage reference value.

7. The torque control method according to claim 5, wherein the calculating of the torque compensation value comprises:
calculating the torque compensation value according to a value which is obtained by multiplying the variation of flux linkage by a number of poles of the motor by a torque-shaft current value.

8. The torque control method according to claim 5, wherein the compensating for the error of required torque comprises:
compensating for the error of required torque based on the change in temperature of the motor by adding the torque compensation value to a required torque.

9. A motor controller, comprising:
a torque control apparatus estimating a variation of flux linkage based on a change in temperature of a motor measured by a temperature sensor and compensating for an error of required torque of a torque command based on a torque compensation value corresponding to a current temperature of the motor calculated based on an estimated variation of flux linkage;
a current map selecting and outputting a current command matching the torque command based on a required torque error-compensated by the torque control apparatus, a rotating speed of the motor, and a voltage;
a current regulator selecting and outputting a voltage command corresponding to the current command selected by the current map; and
an electric power module converting a required voltage of the voltage command into a 3-phase voltage of a pulse width modulation (PWM) form and outputting the 3-phase voltage to the motor.

* * * * *